(12) United States Patent
Toyohara et al.

(10) Patent No.: US 8,280,613 B2
(45) Date of Patent: Oct. 2, 2012

(54) CONTROL APPARATUS FOR INTERNAL COMBUSTION ENGINE

(75) Inventors: Masahiro Toyohara, Hitachiota (JP);
Takashi Okamoto, Hitachinaka (JP);
Tomohiro Ohisa, Hitachinaka (JP);
Yoshikazu Ishii, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 236 days.

(21) Appl. No.: 12/856,034

(22) Filed: Aug. 13, 2010

(65) Prior Publication Data

US 2011/0100333 A1    May 5, 2011

(30) Foreign Application Priority Data

Oct. 30, 2009   (JP) ................................. 2009-250731

(51) Int. Cl.
*F02M 51/00*    (2006.01)
(52) U.S. Cl. .................... 701/104; 701/105; 123/490
(58) Field of Classification Search .................. 701/104, 701/105; 123/490
See application file for complete search history.

(56) References Cited

U.S. PATENT DOCUMENTS

| | | | | |
|---|---|---|---|---|
| 5,050,564 A | * | 9/1991 | Suzuki et al. ................. | 123/492 |
| 5,408,975 A | * | 4/1995 | Blakeslee et al. ............ | 123/491 |
| 5,699,772 A | * | 12/1997 | Yonekawa et al. ........... | 123/497 |
| 5,715,797 A | * | 2/1998 | Minagawa et al. ........... | 123/497 |
| 6,473,286 B1 | | 10/2002 | Itabashi et al. | |
| 8,141,540 B2 | * | 3/2012 | Wagner et al. ................ | 123/436 |
| 2003/0062029 A1 | | 4/2003 | Oyama et al. | |

FOREIGN PATENT DOCUMENTS

| | | |
|---|---|---|
| JP | 2001-164961 A | 6/2001 |
| JP | 2001-248478 A | 9/2001 |
| JP | 2003-65129 A | 3/2003 |
| JP | 2003-106200 A | 4/2003 |
| JP | 3562125 B2 | 6/2004 |
| JP | 3768723 B2 | 2/2006 |
| JP | 4486183 B2 | 4/2010 |

OTHER PUBLICATIONS

Japanese Office Action dated Mar. 21, 2012 (Two (2) pages).

* cited by examiner

*Primary Examiner* — Erick Solis
(74) *Attorney, Agent, or Firm* — Crowell & Moring LLP (57) ABSTRACT

A fuel injection control apparatus for an internal combustion engine which can inject a fuel injection quantity to a fuel injector with accuracy even when the fuel injection quantity is reduced than before is provided. A fuel injection control apparatus of a direct cylinder injection type of internal combustion engine, including a fuel injector which performs fuel injection by supplying a drive current to a solenoid, a fuel pressure sensor which detects fuel pressure supplied to the fuel injector, and operation state detecting means which detects the operation state of the internal combustion engine, comprises current profile changing means 100 which has multiple current profiles of the drive current and changes current profiles based on the operation state and the fuel pressure, valid pulse width calculating means 701 which calculates a valid pulse width for opening and driving the fuel injector, invalid pulse width calculating means 103 which calculates an invalid pulse width, and fuel injector control means which calculates a fuel injection pulse width based on the valid pulse width and the invalid pulse width, and controls the fuel injector based on the fuel injection pulse width, wherein the invalid pulse width calculating means 103 calculates an invalid pulse width corresponding to the current profiles to be changed before the current profiles are changed.

8 Claims, 11 Drawing Sheets

CONTROL APPARATUS FOR INTERNAL COMBUSTION ENGINE

BACKGROUND OF THE INVENTION

1. Field of the Invention

The present invention relates to a fuel injection control apparatus for an internal combustion engine, and particularly to a fuel injection control apparatus preferred for fuel injection of a direct cylinder injection type of an internal combustion engine.

2. Background Art

An internal combustion engine is provided with a fuel injection control apparatus which controls an injector. The fuel injection control apparatus calculates an appropriate fuel injection quantity in accordance with an operation state of the internal combustion engine and drives and controls an injector which supplies fuel. An injector is of an electromagnetic type which supplies a current through an electromagnetic coil (solenoid) contained in the injector in order to open the injector and keep a valve opening state. This generates an electromagnetic force by which opening/closing operation of a plunger which constitutes an injector is performed to inject an amount of fuel corresponding to a valve opening period.

The amount of fuel injected is mainly determined by a pressure difference between fuel pressure and ambient pressure at the nozzle hole portion of the injector, and the time in which the plunger is kept open and the fuel is injected.

Therefore, in order to perform injection of an appropriate amount of fuel, not only time to keep valve opening of the injector according to fuel pressure needs to be set, but also opening/closing operation of a plunger needs to be performed quickly and with accuracy.

However, before a plunger actually closes after energization to the injector is finished, a closing operation of the plunger is accompanied by a delay due to a response delay of a current circuit or the like. Conventionally, it is a common practice to set an electric energization time to the injector (to make a correction to an injection pulse operation in advance, as an invalid pulse width) considering the response delay.

Alternatively, a method for controlling a response delay of a current circuit to the minimum by rapidly discharging a valve opening current when a current supplied to a solenoid is switched from a high current for causing the injector to perform valve opening operation (hereinafter referred to as an opening current) to a low current for maintaining a valve opening state (hereinafter referred to as a holding current)(see Patent Document 1, JP Patent No. 3562125 publication, for example) has been known.

In addition, in order to strengthen a valve opening force of the injector in accordance with a fuel pressure, a fuel injection control apparatus which variably sets a period of time to supply a peak current when an opening current reaches a peak has been proposed. This fuel injection control apparatus shortens a peak current holding time of the opening current, when a pulse width of the injector is short. A response delay of a current circuit is stabilized by making a flowing current to the injector become a holding current when the supply of peak current to the injector ends (see Patent Documents 2, JP Patent Publication (Kokai) No. 2003-65129 and Patent Document 3, JP Patent No. 3768723 publication, for example).

In addition to them, a fuel injection control apparatus which searches a dead time correction table based on fuel pressure and corrects an invalid pulse width based on the search result has also been proposed (see Patent Document 4, JP Patent Publication (Kokai) No. 2001-164961, for example).

SUMMARY OF THE INVENTION

In recent years, from the viewpoint of reduction in fuel consumption, reduction in the idle speed of an internal combustion engine has been required, and in response to this, the demand for minimization of the fuel amount which the fuel injector can inject tends to be high. Likewise, for reduction in fuel consumption, the occasion increases in which the fuel cut is performed during which fuel injection is not performed if output power of the internal combustion engine is not needed, and accordingly the frequency of fuel recover increases. When fuel recover is performed, a small fuel amount corresponding to no load needs to be injected. Further, for the purpose of increasing the output power and enhancing exhaust performance, split injection has been performed recently. This intends to enhance the performance of the internal combustion engine by splitting the fuel originally required for one injection into a plurality of times, and injecting the split fuels at proper timings, and reduction in the fuel injection quantity per one time is required.

Thus, in response to the demand for improvement of performance of the internal combustion engine, a fuel injection control apparatus capable of injecting a small amount of fuel is demanded. When a small amount of fuel injection is performed, duration of keeping valve opening of the fuel injector (valid duration (valid pulse width)) should be reduced. Then, percentage of delay time in valve opening from when the plunger changes from the valve closing state to the valve opening state and delay time in valve closing state from the valve opening state to the valve closing state (referred to as invalid duration (invalid pulse width), to the duration of maintaining the valve opening of the injector (fuel injector) increases. Thus, an error in this invalid duration will have a direct major impact on accuracy of an injection quantity.

However, even if control of fuel injection is performed with the apparatuses of Patent Documents 1 to 4, fluctuation of fuel injection quantity occurred sometimes due to a response delay. This was because influence of change in the fuel injection quantity as a result of the response delay in a current circuit which supplies drive current to the injector was not taken into consideration.

The present invention has been made in light of such problems, and an object of the present invention is to provide a fuel injection control apparatus for an internal combustion engine which can inject a fuel injection quantity to an injector with accuracy even when the fuel injection quantity is reduced compared with the past.

The inventors earnestly made a study in light of the problems described above, and consequently obtained new knowledge that a change in profile (waveform) of a drive current to a solenoid contributes to a variation in invalid time (invalid pulse width) of the injector, the variation impairing accuracy of the fuel injection quantity, thus preventing improvement of performance of control of an air fuel ratio of the internal combustion engine.

The present invention is based on new knowledge of the inventors, and a fuel injection control apparatus for injecting a fuel directly into a combustion chamber of an internal combustion engine according to the invention, including a fuel injector which performs fuel injection by supplying a drive current to a solenoid, a fuel pressure sensor which detects fuel pressure supplied to the fuel injector, and operation state detecting means which detects an operation state of the internal combustion engine, includes current profile changing means which has multiple current profiles of the drive current and changes the current profiles based on the operation state and the fuel pressure; valid pulse width calculating means which calculates a valid pulse width corresponding to a fuel injection quantity for opening and driving the fuel injector, based on the operation state and the fuel pressure; invalid pulse width calculating means which calculates an invalid pulse width corresponding to the valve opening delay and valve closing delay of the fuel injector based on the fuel pressure; and fuel injector control means which calculates a fuel injection pulse width based on the valid pulse width and the invalid pulse width and controls the fuel injector based on the fuel injection pulse width, wherein the invalid pulse width calculating means calculates an invalid pulse width corresponding to the at least current profiles to be changed, before the current profiles are changed.

According to the present invention, since fuel injection is performed with an appropriate fuel injection pulse width even though current waveform or a current value of a drive current to be supplied to the fuel injector, that is to say, a current profile is changed, accuracy of the fuel injection quantity can be maintained or improved.

DETAILED DESCRIPTION OF THE PREFERRED EMBODIMENTS

Hereinafter, with use of FIGS. 1 to 13, a configuration and an operation of a fuel injection control apparatus for injecting a fuel directly into a combustion chamber of an internal combustion engine according to the present embodiment of the present invention will be described.

Figure 1:
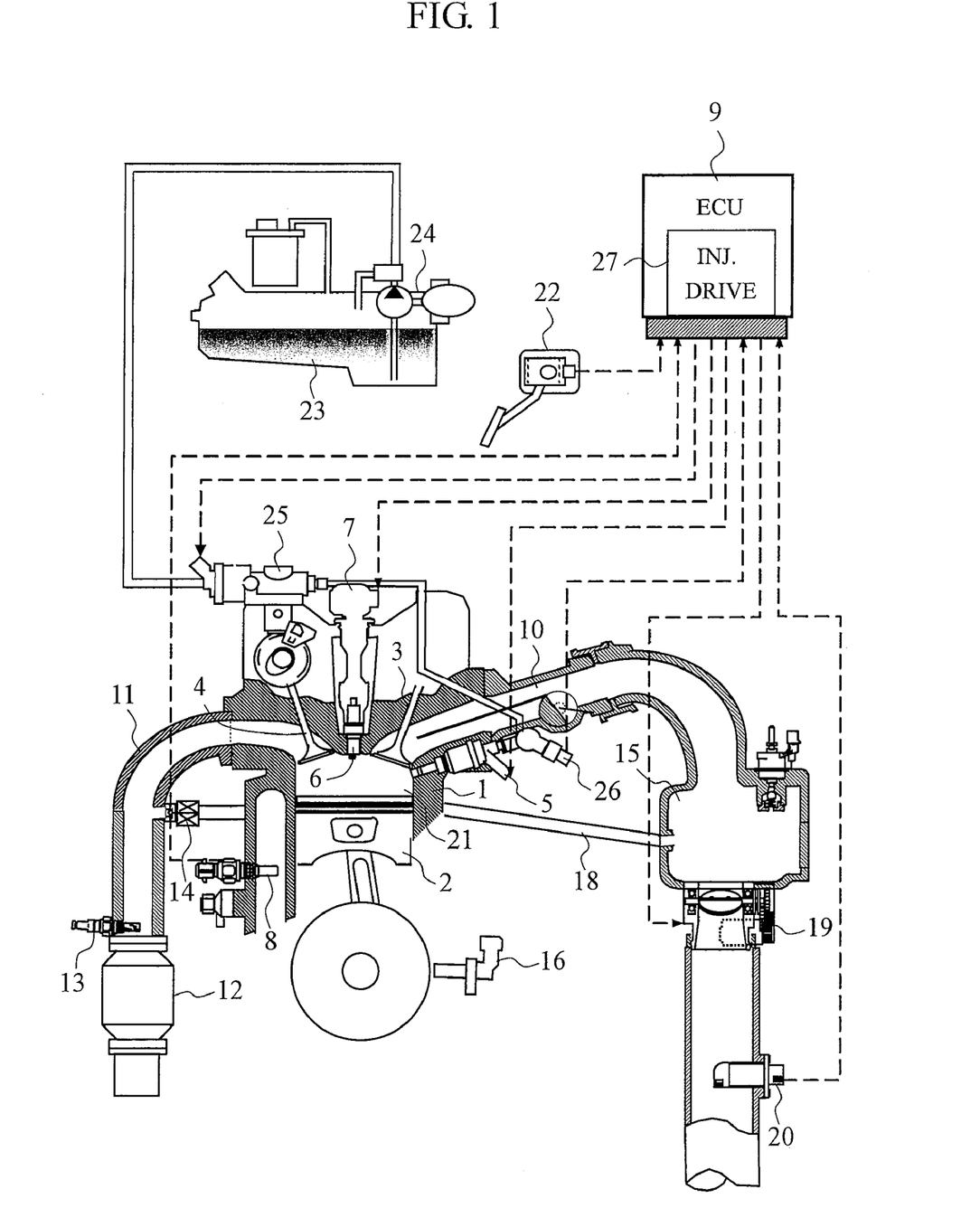
FIG. 1 is an overall configuration diagram of an internal combustion engine system that incorporates a fuel injection control apparatus according to an embodiment.

Firstly, a configuration of an internal combustion engine system to which a fuel injection control apparatus according to the present embodiment is mounted will be described. FIG. 1 is an overall configuration diagram of the internal combustion engine system to which the fuel injection control apparatus according to the present embodiment is mounted.

An internal combustion engine (engine) 1 has a piston 2, an intake valve 3, and an exhaust valve 4. Intake air to the internal combustion engine 1 (incoming air) passes through an air flowmeter (AFM) 20, has a flow rate regulated by a throttle valve 19, and is supplied to a combustion chamber 21 of the engine 1 through an intake pipe 10 and the intake valve 3 from a collector 15, which is a branching section.

Fuel is supplied from a fuel tank 23 to a high pressure fuel pump 25 by a low pressure fuel pump 24, and the pressure of the fuel is increased to a level needed for fuel injection by the high pressure fuel pump 25. Then, the fuel with increased pressure by the high pressure fuel pump 25 is directly injected and supplied to the combustion chamber 21 of the engine 1 from the injector (fuel injector) 5, and ignited by using an ignition coil 7 and an ignition plug 6. The pressure of the fuel which is supplied to the injector 5 is measured by a fuel pressure sensor (fuel pressure sensor) 26. In addition, the injector 5 is a fuel injection valve of electromagnetic type that operates a plunger and performs fuel injection as a result of a drive current being supplied (current supply) to a solenoid to be described later.

Exhaust gas after combustion is exhausted to an exhaust pipe 11 through the exhaust valve 4. The exhaust pipe 11 is equipped with a three-way catalyst 12 for purifying the exhaust gas. The exhaust pipe 11 and the collector 15 are connected by an EGR passage 18. An EGR valve 14 is provided halfway through the EGR passage 18. The opening degree of the EGR valve 14 is controlled by an ECU 9, and the exhaust gas in the exhaust pipe 11 is returned to the intake pipe 10, in accordance with necessity.

The ECU (Engine Control Unit) 9 is an electronically controlled type including a microcomputer, and includes a fuel injection control apparatus 27. It receives input of a crank angle signal of a crank angle sensor 16 of the engine 1, an intake air amount signal of the AFM 20, an oxygen concentration signal of an oxygen sensor 13 which detects the oxygen concentration in exhaust gas, an accelerator opening degree signal of an accelerator opening degree sensor 22, and a fuel pressure signal of a fuel pressure sensor 26. In addition, the ECU 9 not only calculates a required torque to the engine from the signal of the accelerator opening degree sensor 22 but also determines an idle state or the like.

The ECU 9 has engine speed detecting means which calculates an engine speed from the crank angle signal of the crank angle sensor 16. It is also provided with means for determining whether the three-way catalyst 12 has been warmed up, based on coolant temperature of the internal combustion engine to be obtained from a coolant temperature sensor 8 and elapsed time after the engine started, or the like.

In addition, the ECU 9 calculates the intake air amount necessary for the engine 1, and outputs a throttle opening degree signal corresponding thereto to the throttle valve 19. The fuel injection control apparatus 27 calculates the fuel injection quantity corresponding to the intake air amount, outputs a fuel injection signal (signal corresponding to a fuel injection pulse width) to the injector 5 based on the calculated fuel injection quantity, and outputs an ignition signal to the ignition plug 6.

Figure 2:
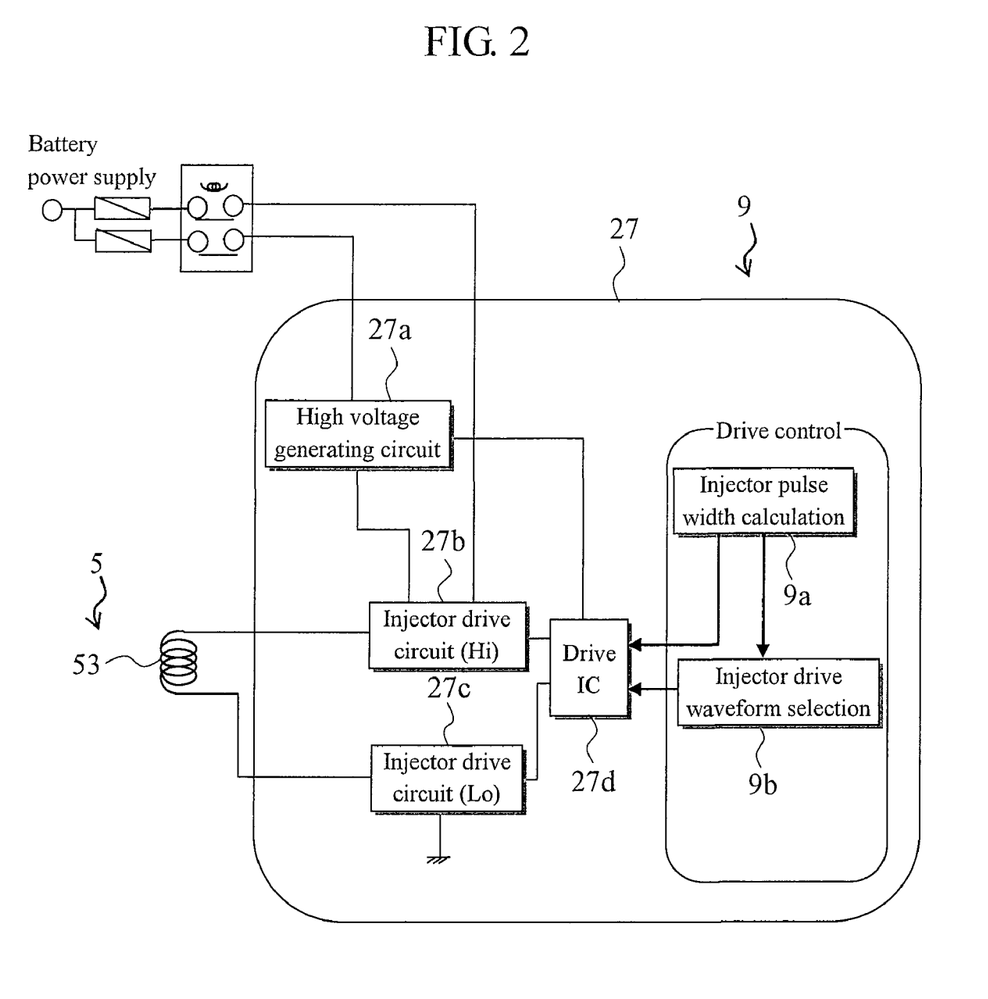
FIG. 2 is a configuration diagram of the fuel injection control apparatus according to the embodiment.

FIG. 2 is a configuration diagram of the fuel injection control apparatus 27 according to the present embodiment, and the fuel injection control apparatus is incorporated in the ECU 9, as shown in FIG. 1.

The fuel injection control apparatus calculates a proper injector duration time and injection start timing in accordance with the operation state of the engine 1, switches an injector drive circuit (Hi) 27b and an injector drive circuit (Lo) 27c by using a drive IC 27d, and supplies a drive current (energizing current) to a solenoid (electromagnetic solenoid for valve opening drive) 53 of the injector 5.

A high voltage generating circuit 27a generates high power-supply voltage necessary for opening of the injector based on the battery power supply of the internal combustion engine. The high power-supply voltage generates desired power-supply voltage according to a command to generate the high power-supply voltage from the drive IC 27d.

The injector drive circuit 27b includes a switching element, and is connected to between the high voltage generating circuit 27a and the solenoid 53 and to between the battery power supply and the solenoid 53. The injector drive circuit 27b selects any of the high power-supply voltage generated by the high voltage generating circuit 27a or a low power-supply voltage, which is the battery power supply, for the injector 5, and supplies the selected power-supply voltage to the solenoid 53 of the injector 5. When opening from closing of the injector 5, by selecting and supplying the high power-supply voltage, the injector drive circuit 27b supplies an opening current (drive current) necessary for opening to the solenoid 53 of the injector 5. If it maintains a valve opening state of the injector 5, the injector drive circuit 27b switches the power-supply voltage to the battery voltage (low power-supply voltage), and supplies a holding current (drive current) to the solenoid of the injector 5.

The injector drive circuit (Lo) 27c is a drive circuit provided in the downstream of the injector, to flow (supply) a drive current to the injector 5, similar to the injector drive circuit (Hi) 27b.

A drive period of the injector 5 (injector duration time to the injector), a drive power-supply voltage value and a drive current value by the drive IC 27d are controlled by a command calculated by an injector pulse width calculating means 9a and an injector drive waveform selecting means 9b. Specifically, the injector pulse width calculating means 9a calculates a fuel injection pulse width for driving the injector 5, and outputs it to the drive IC 27d. On the one hand, the injector drive waveform selecting means 9b selects a waveform (current profile) of the drive current to be supplied to the solenoid 53 of the injector 5 based on the calculation result of the injector pulse width calculating means 9a and the operation state of the internal combustion engine, and outputs it to the drive IC 27d.

The drive IC 27d supplies a desired drive current to the solenoid 53 of the injector 5 by outputting a drive signal to these circuits 27a to 27c and drive controlling the circuits 27a to 27c, and controls fuel injection of the injector 5. Thus, the drive IC 27d optimally controls the fuel injection quantity necessary for combustion of the internal combustion engine by performing the drive control of the injector.

Figure 3:
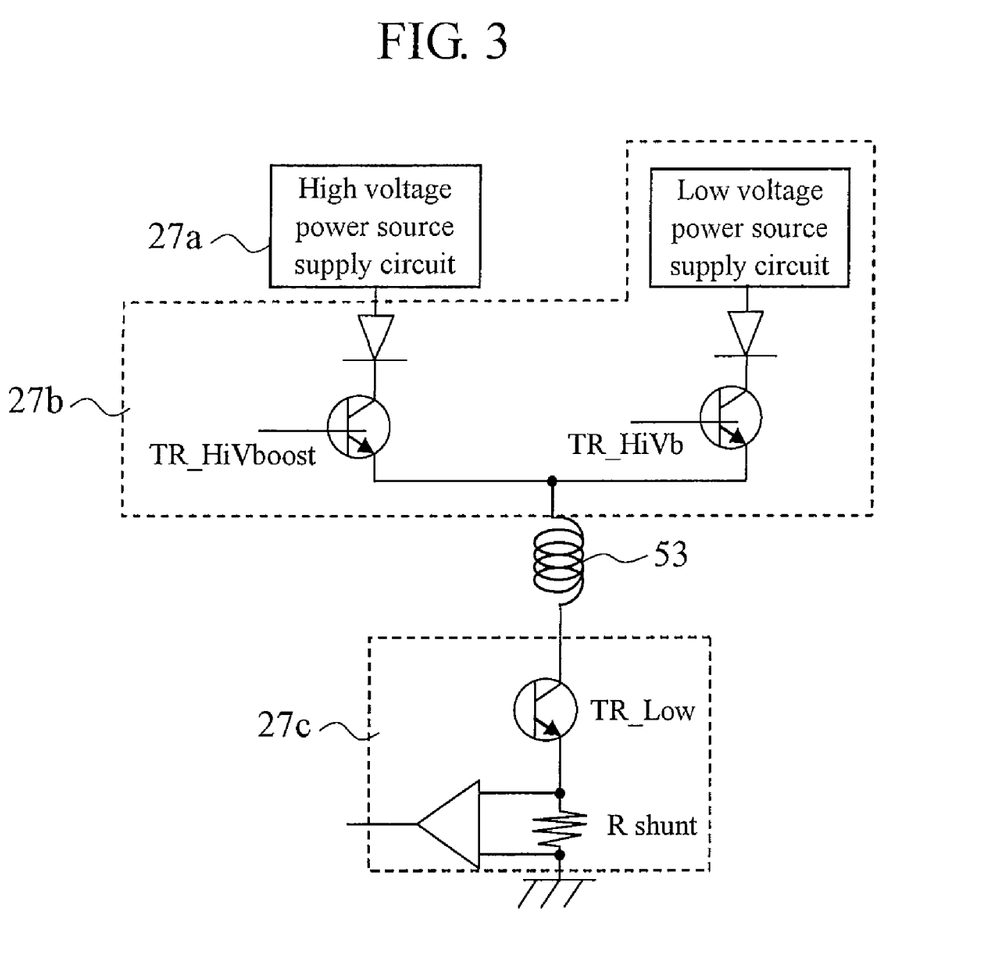
FIG. 3 is a view showing one example of a drive circuit of the injector (fuel injector) shown in FIG. 2.

FIG. 3 is a view showing one example of the drive circuit of the injector shown in FIG. 2. As illustrated in FIG. 2, in the upstream of the injector 5, high voltage for supplying a high current needed to open the injector (the opening current) is provided from the high voltage generating circuit 27a in the figure through a diode for preventing current reverse flow and by a TR_Hivboost circuit of the injector drive circuit (Hi) to provide power supply (drive current) to the injector 5.

On the one hand, after the injector 5 is opened and driven, a low current (holding current) needed to maintain (keep) the valve opening state of the injector 5 is supplied. Specifically, similar to the high voltage, through the diode for preventing current reverse flow, power supply (drive current) is supplied from the low-voltage power source supply circuit connected to the battery power supply to the injector 5 by using the TR_Hivb circuit of the injector drive circuit (Hi) 27b. Now, the high voltage generating circuit 27a may have a configuration such as a generally known DC-DC converter or the like, a configuration of which is not directly related to the present invention and thus does not require a detailed description. Similarly, the low voltage may be the battery power supply itself of the internal combustion engine, and thus does not require a detailed description, either.

Next, in the downstream of the injector 5, by turning the drive circuit TR_Low ON, the drive current supplied in the upstream is supplied to the injector, and by a shunt resistance located in the downstream thereof, the current flowing to the injector 5 is detected, thereby desired injector current control being performed as described later.

Figure 4:
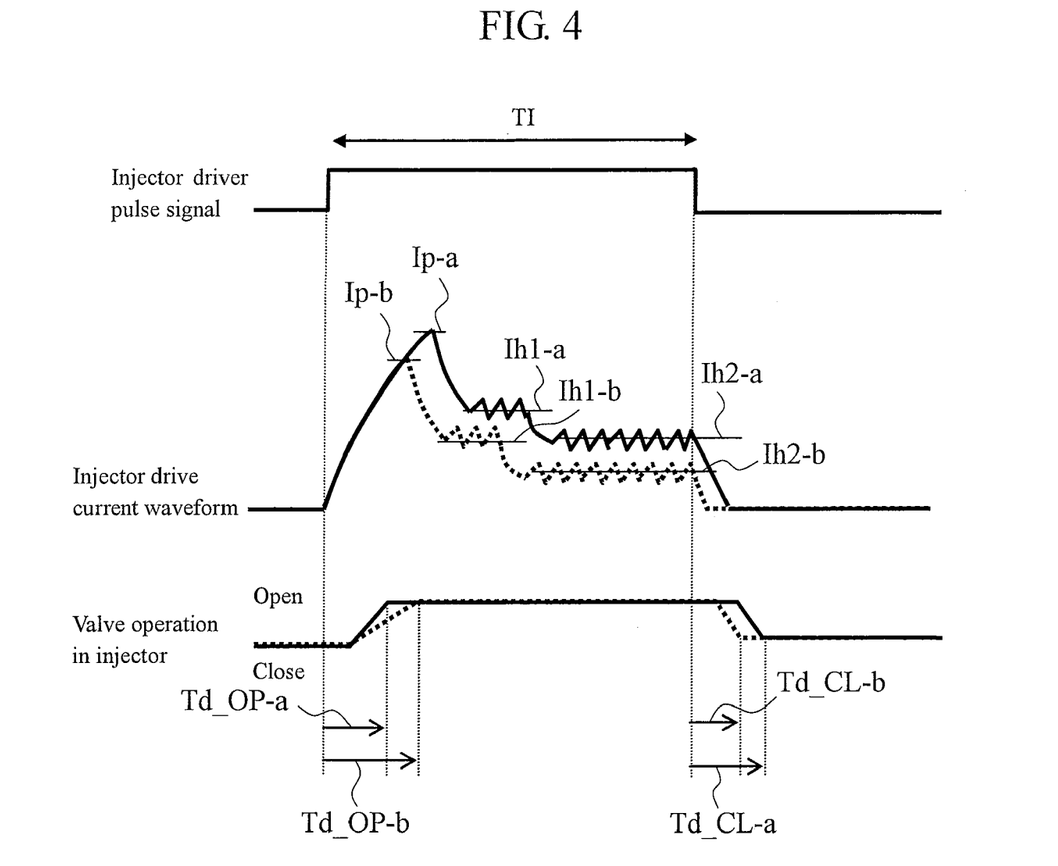
FIG. 4 is a view showing a fuel injection pulse width, a current profile of a drive current of the injector, and an opening/closing position of a plunger within the injector.

FIG. 4 is a view showing the fuel injection pulse width TI, a current profile of a drive current of the injector, and an opening/closing position of a plunger in the injector according to the present embodiment.

Now, a diagram of the upper part of the figure shows the injector driver signal, which is a pulse signal to generate based on a calculation value (fuel injection pulse width TI) calculated by the injector pulse width calculating means 9a of FIG. 2. A diagram in the middle part of the figure shows the drive current profile (waveform) which is supplied to the solenoid 53 of the injector 5 by using the injector drive circuit shown in the above-mentioned FIG. 2 and FIG. 3 with an injector driver signal. The lower part of the figure shows the opening/closing position of the plunger of the injector 5 which is driven by this drive current. In addition, the diagrams in the middle show two current profiles of the injector 5. The solid line and dotted line (the solid line is represented by -a at the end of the numerals in the figure, and the dotted line is represented by -b at the end of the numerals in the figure) respectively correspond to each diagram.

First, the current profile of the drive current of the injector and the opening/closing position of the plunger of the injector, which are represented by the solid lines (-a indicted at the end of the numerals in the figure) will be described. As shown in the diagram in the upper part of FIG. 4, when the drive IC 27d receives a signal of the fuel injection pulse width (driver signal) TI, the drive IC 27d simultaneously turns ON the drive circuit TR_Hivboost and TR_Low shown in FIG. 3 when the fuel injection pulse Ti signal rises, and supplies the opening current IP-a needed for quickly opening the injector 5 as shown in the diagram in the middle part of FIG. 4. As shown in FIG. 3, the high voltage from the high voltage generating circuit is applied to the injector and the opening current (drive current) is supplied.

When a value of the current flowing to the injector reaches a peak value Ip-a as shown in FIG. 4, the drive IC 27d turns OFF the drive circuit TR_Hivboost. Then, the opening current Ip-a is 11 A, for example.

When a value of the drive current flowing to the injector 5 approaches a first target value Ih1-a which can maintain valve opening of the injector 5, as a result of turning OFF the drive circuit TR_Hivboost after the drive current reaches the opening current Ip-a, the drive IC 27d turns ON the drive circuit TR_Hivb and supplies a drive current to the injector 5 from a low voltage source. Here, the drive IC 27d turns ON and OFF the drive circuit TR_Hivb so as to hold the current value of the drive current at the first target value Ih1-a which can maintain the valve opening of the injector 5. For example, the first target value Ih1-a is 5 A.

When predetermined period of time has elapsed after it received the TI signal, the drive IC 27d turns ON and OFF the drive circuit TR_Hivb so as to hold the current value of the drive current at a second target value Ih2-a which can maintain the valve opening. For example, the second target value Ih2-a is 3 A. Subsequently, at the same time when the driver signal Ti signal falls, the drive IC 27d turns OFF all the drive circuits TR_Hivboost, TR_Hivb, and TR_Low, and supply of the current to the injector 5 (solenoid 53) is stopped.

Opening and closing of the injector 5 delay from the time point at which the fuel injection control apparatus actually desires to open and close the valve due to a response delay of the current attributable to the internal circuits of the fuel injection control apparatus 27 or harness up to the injector 5, and a response delay of the generated electromagnetic force and the plunger. That is to say, as shown in FIG. 4, after a response delay time Td_OP-a following output of the fuel injection pulse signal, the plunger of the injector 5 completely moves to a valve opening position, and after a response delay time Td_CL-a following stop of the output of a fuel injection pulse width signal, the plunger of the injector 5 completely moves to a valve closing position.

Next, the current profile of the drive current to the injector and the opening/closing position of the plunger of the injector shown by the dotted lines (-b indicted at the end of the numerals in the figure) will be described. The current profile of the drive current of the injector shown in a diagram in the middle part of FIG. 4 is of a lower current profile compared with the values (Ip-a, Ih1-a, Ih2-a) of the drive current shown by the solid lines.

The diagram in the lower part of FIG. 4 shows the position of the plunger of the injector when the injector 5 is driven by the drive current shown by the dotted line. In addition, a relation of the current profile shown by the dotted line and the position of the plunger of the injector is same as the content of the above description by the solid lines, and omitted because no description is needed herein.

Compared with the time shown by the solid line, the time shown by the dotted line for completely moving from the closing of the plunger of the injector 5 to the valve opening position is relatively long (Td_OP-a<Td_OP-b). This occurs because, as shown in the figure, the peak value of the drive current of the injector is small (Ip-b<Ip-a). On the one hand, compared with the time shown by the solid line, time shown by the dotted line for completely moving from the valve opening position of the plunger of the injector to the closing position is relatively short (Td_CL-b<Td_CL-a). This occurs because, as shown in the figure, the value of the drive current of the injector is small.

Figure 5:
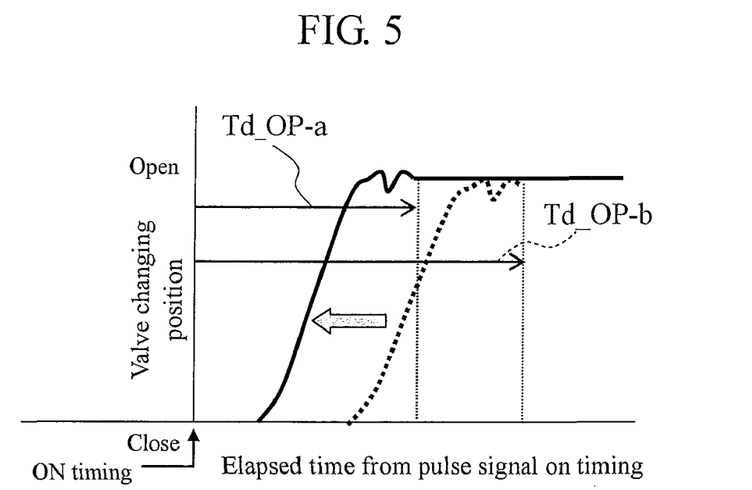
FIG. 5 is a view showing one example of valve opening characteristics of the injector shown in FIG. 4.

FIG. 5 is a view showing one example of the valve opening characteristic of the injector 5 as shown in FIG. 4. As shown in FIG. 5, supply of a drive current to the solenoid 53 of the injector 5 starts at the ON timing (output timing) of the injector driver signal TI. From this timing, the injector 5 (plunger) takes a predetermined time and starts the operation from the valve closing state to the valve opening state. Subsequently, the injector 5 takes a predetermined time to reach the valve opening state and maintains the valve opening state.

The operation of this injector is influenced by force of a return spring provided in the injector 5 and fuel pressure. Specifically, the opening operation of the injector is started when valve opening force of the injector because of the drive current (energizing current) exceeds (becomes stronger than) total force of the return spring force acting to close the injector 5 and valve closing force resulting from the fuel pressure acting on the injector. Since the valve opening force of the injector differs depending on a current profile of a drive current, an elapsed time (that is to say, valve opening delay) till the injector 5 opens after the driver signal (fuel injection pulse) turns ON will be represented by Td_OP-a and Td_OP-b (here, Td_OP-a and Td_OP-b in the figure are same as those described in FIG. 4).

Figure 6:
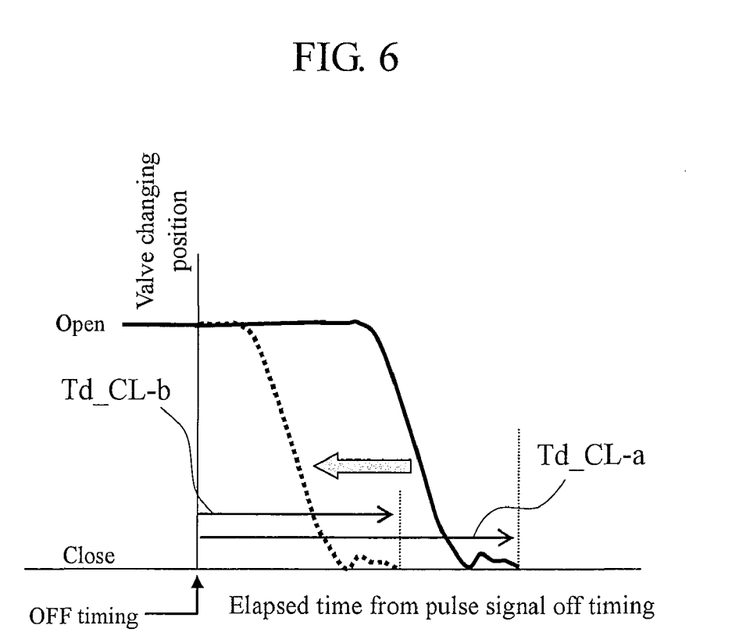
FIG. 6 is a view showing one example of valve closing characteristics of the injector shown in FIG. 4.

FIG. 6 shows one example of the closing valve characteristics of the injector 5 shown in FIG. 4. As shown in FIG. 6, supply of the drive current to the solenoid 53 is stopped at the OFF timing (timing to stop output) of the fuel injection driver signal TI. From this point in time, the injector 5 (plunger) takes a predetermined time to start operation from the valve opening state to the valve closing state. Then, the injector 5 takes a predetermined time to reach the valve closing state and maintains the valve closing state.

Contrary to the content of description in FIG. 5, this closing operation of the injector is started when the total force of the return spring force acting to close the injector 5 and the valve closing force resulting from the fuel pressure acting on the injector exceeds (becomes stronger than) the valve opening force of the injector because of the drive current (energizing current). Since the valve closing force of the injector differs depending on a current profile of a drive current (a current value immediately before OFF and attenuating speed of this current value), an elapsed time till the injector 5 closes after the driver signal of the injector 5 (fuel injection pulse) turns OFF (that is to say, valve closing delay) will be represented by Td_CL-a and Td_CL-b in FIG. 4 (Here, Td_CL-a and TD_CL-b in the figure are same as those described in FIG. 4).

Figure 7:
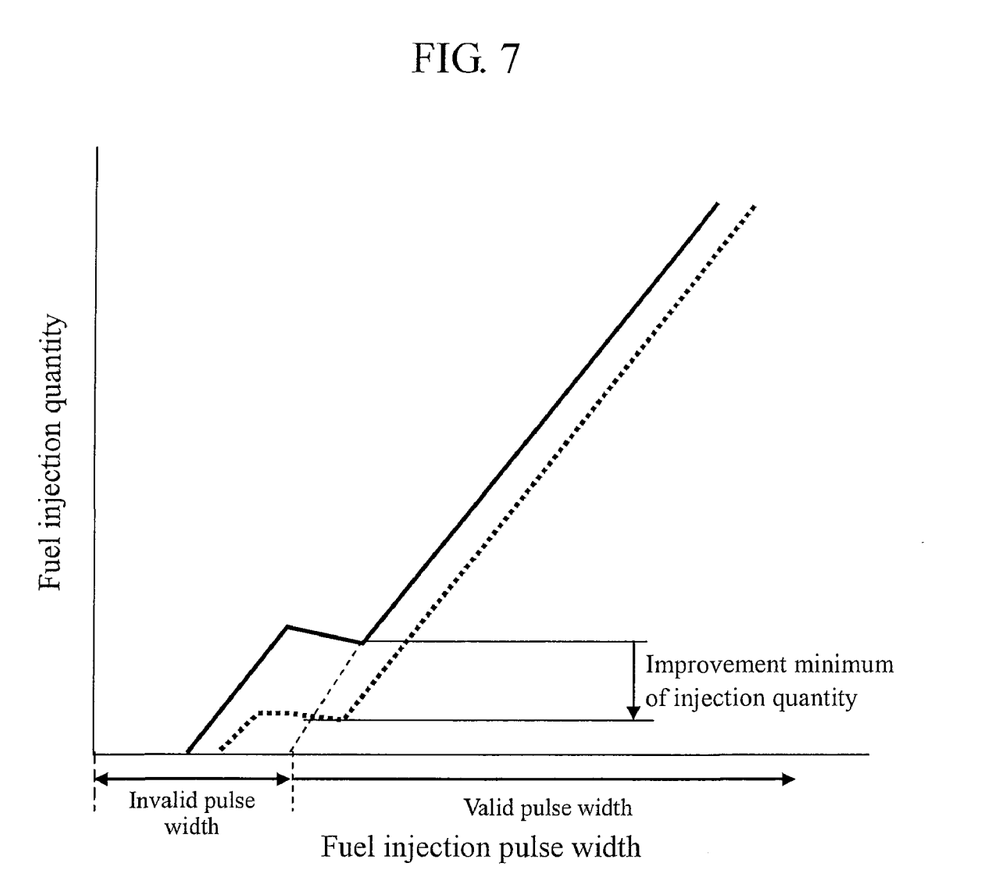
FIG. 7 is a view showing a relationship of a fuel injection pulse width of the injector according to the embodiment and fuel injection quantity.

FIG. 7 is a view showing a relation of a fuel injection pulse width and a fuel injection quantity of the injector according to the present embodiment. As shown in FIG. 7, it is known that the fuel injection quantity to be injected from the injector varies in accordance with the fuel driver signal of the injector. Two diagrammatic views shown by solid line and dotted line in FIG. 7 show characteristics of the fuel injection quantity when a drive current is supplied to a same injector according to two different current profiles, for example as shown in FIG. 4. A difference in the fuel injection quantity characteristics of the injector shown by the solid line and the dotted line is a difference in a pulse width (=invalid pulse width) till fuel injection is performed, and its cause is as described in FIG. 5 and FIG. 6.

In addition, as shown in the figure, an improvement of minimum injection quantity means that a range in which the injector is in proportional, stable fuel injection quantity characteristics to the fuel injection pulse width (horizontal axis in the figure) has expanded. Based on the description given so far, it is learned that by changing a current profile of the injector, not only a flow rising position (invalid pulse width) of the injector changes, but also minimum injection for which the fuel injection characteristic is stable is different.

Thus, it becomes possible to provide a requested minimal injector characteristic without using the injector differently, by changing the current profile of the drive current depending on the operation state of the internal combustion engine or by performing fuel injections multiple times.

Figure 8:
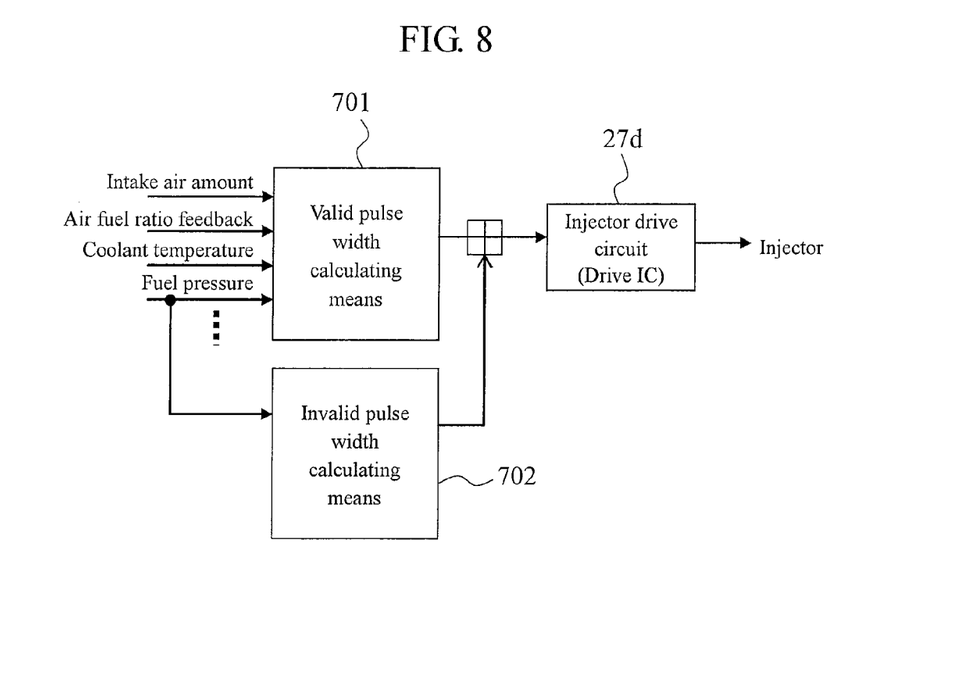
FIG. 8 is a control block of the injector according to a conventional fuel injection control apparatus.

FIG. 8 shows a control block diagram of the injector by the conventional fuel injection control apparatus. The fuel injection control apparatus includes valid pulse width calculating means 701, invalid pulse width calculating means 702, and fuel injector control means (drive IC) 27d, which is an injector drive circuit.

As shown in FIG. 8, the valid pulse width calculating means 701 calculates a requested fuel injection quantity (valid pulse width, if it is put otherwise). To be specific, the valid pulse width calculating means 701 calculates the fuel injection quantity based on the operation state of the internal combustion engine shown in the figure, such as an intake air amount, air fuel ratio feedback, coolant temperature, etc. and fuel pressure of the internal combustion engine. On the one hand, the invalid pulse width calculating means 702 calculates invalid pulse width including valve opening delay till the injector starts injection and valve closing delay till the injector stops. Here, in the internal combustion engine which directly injects fuel into a cylinder, the invalid pulse width of the injector is calculated based on at least the fuel pressure of the internal combustion engine.

Then, direct fuel injection of the actual desired fuel injection quantity to a cylinder in the internal combustion engine from the injection is performed by inputting to the drive circuit 27d the fuel injection pulse width which results from addition of the valid pulse width calculated by the valid pulse width calculating means 701 and the invalid pulse width calculated by the invalid pulse width calculating means 702, and supplying a drive current necessary for injection of the injector. In addition, here, basically, a valve opening delay component of the invalid pulse width is added to the valid pulse width, and a valve closing delay component of the invalid pulse width is subtracted from the valid pulse width, thereby the fuel injection pulse width being calculated.

Figure 9:
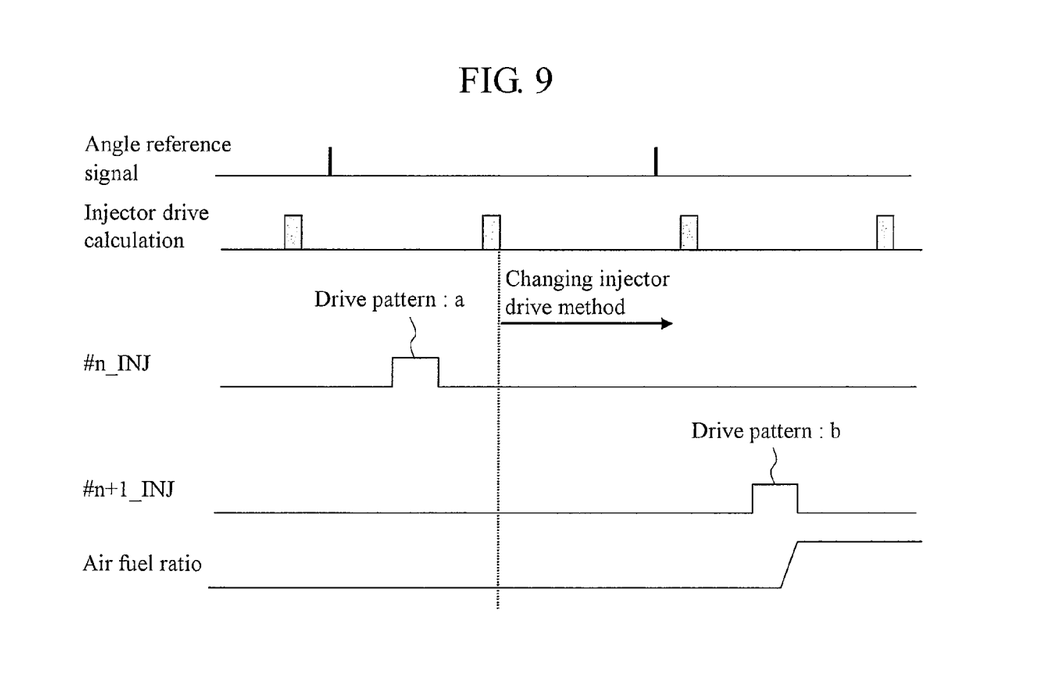
FIG. 9 is a time chart when changing a drive current to be supplied to the injector, by using the conventional fuel injection control apparatus shown in FIG. 8.

FIG. 9 shows a timing chart of when the drive current to be supplied to the injector is changed by using the conventional fuel injection control apparatus as shown in FIG. 8.

Here, as shown in the diagram in the upper part of FIG. 9, the fuel injection control apparatus performs control of the injection timing based on an angle reference signal from the crank angle sensor, calculation of the fuel injection pulse width of this injector is performed by injector drive calculation (the valid pulse width calculating means and invalid pulse width calculating means) at intervals of 10 ms, for example. Then, as shown in the diagram in the middle part, the fuel injection control apparatus outputs a value corresponding to the fuel injection pulse width which has been calculated immediately before to the injector as fuel injection pulse signals of #n and #n+1 (signals in #n_INJ, #n+1_INJ as shown in the figure).

Thus, at the time of this injection timing, the latest calculated fuel injection pulse width of the injector is outputted. Here, if the current profile of the drive current of the injector is changed, a current profile (drive pattern) a is performed on the injector of #n cylinder, and a current profile (drive pattern) b of the injector is performed on the injector of #n+1 cylinder. In this case, as described in FIG. 4 to FIG. 8, control of the fuel injection quantity cannot be accurately performed unless the current profile of the injector matches the fuel injection pulse width (drive pulse width) of the injector, and the air fuel ratio of the internal combustion engine as shown in the lower part of the figure will fluctuate. This will result in problems of exhaust emission or damaged drivability.

In the above description, for convenience, although as a method for changing a current profile of the injector, two methods for changing the current profile are exemplified, such a problem should not be limited to the number of current profiles.

Figure 10:
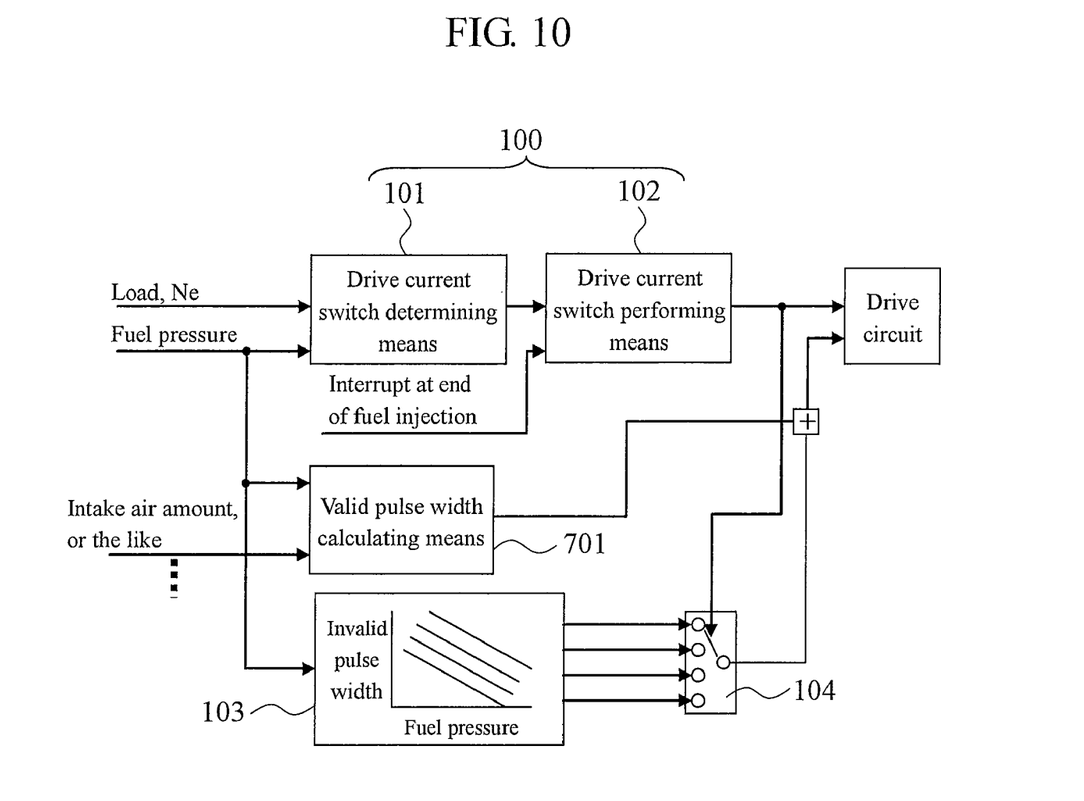
FIG. 10 is a view showing one example of a control block diagram of the injector according to the embodiment.

FIG. 10 shows one example of a control block diagram of the injector according to the present embodiment. FIG. 10 shows one example in which stable control of the fuel injection quantity can be provided without fluctuating the air fuel ratio, even if the current profile is switched (changed) to a different current profile of the injector when the drive current profile of the injector, as shown in FIG. 9, is changed.

The fuel injection control apparatus 27 according to the present embodiment includes current profile changing means 100 which has multiple current profiles of drive currents and changes a current profile based on the operation state of the internal combustion engine such as a load and the number of revolutions Ne and fuel pressure of the internal combustion engine, the current profile changing means 100 including drive current switch determining means 101 and drive current switch performing means 102.

The drive current switch determining means 101 has multiple current profiles of drive currents, and determines if a condition on whether or not a current profile of an injector of a cylinder that will perform fuel injection next is changed has been met, based on the operation state of the internal combustion engine such as a load of the internal combustion engine and the engine speed Ne, etc and fuel pressure. For example, when a fuel injection quantity that the injector is requested to inject is small, the drive current switch determining means 101 selects a current profile of the injector with which the minimum injection quantity will be small, as described in FIG. 7.

Next, the drive current switch performing means 102 determines whether timing at which a change process of the current profile of the injector is really performed is satisfied, and performs the change process if it is satisfied. The drive current switch performing means should perform the performing process when the injector is not actually driven (because such a timing condition is satisfied). That is to say, in the drive period during which the injector is driving, the drive current switch performing means 102 maintains the desired drive current profile so that the drive current profile will not be changed. For example, based on an interrupt signal at the end of the fuel injection, the drive current switch performing means 102 changes the current profile, synchronous with the end of injection of the injector.

In addition, as an alternate aspect, the drive current switch performing means 102 may change the current profile in a period after the injector ends injection till when it starts next fuel injection. In this case, the drive current switch performing means 102 may perform the change in the period after the injector ends the injection till it starts the next fuel injection at timing when a predetermined time elapses after the injector ends the fuel injection (timing at which no fuel injection is performed), and may also perform the change in the period after the injector ends the injection till it starts the next fuel injection at a crank angle at which the fuel injection is not performed.

The valid pulse width calculating means 701 performs a calculation as described in FIG. 8 since it is not related to the fuel injection drive current profile. To be specific, the valid pulse width calculating means 701 calculates a valid pulse width to open and drive the injector, which corresponds to a fuel injection quantity, based on the operation state of the internal combustion engine such as an intake air amount, air fuel ratio, etc., and fuel pressure.

Based on fuel pressure, the invalid pulse width calculating means 103 calculates an invalid pulse width which corresponds to valve opening delay and valve closing delay of the injector. Here, the invalid pulse width calculating means 103 calculates an invalid pulse width corresponding to at least a current profile to be changed, before the current profile is changed. More preferably, it calculates an invalid pulse width corresponding to all patterns of multiple current profiles that the drive current switch determining means 101 has. Then, according to the change of the current profile by the drive current switch performing means 102 (to be specific, according to the timing after the current profile is changed and after the fuel injection ends), the selecting means 104 selects the invalid pulse width corresponding to the changed current profile, and performs control of the injector in the drive circuits mentioned above, based on the selected invalid pulse width and the valid pulse width calculated by the valid pulse width calculating means 701.

Thus, even if the drive current switch performing means 102 actually performs the change of the current profile of the injector, it is possible to perform fuel injection control with optimum fuel injection pulse width without causing a calculation delay in the injector drive pulse width suitable for the current profile.

As another aspect, if the order of changing the drive current profile of the injector is determined in advance, the invalid pulse width calculating means 103 does not need to calculate all the invalid pulse width, and may also perform calculation limited to a drive current profile next time when a change is made, based on the minimum drive current profile being performed and changing order. That is to say, the invalid pulse width calculating means 103 has only to perform at least calculation of the invalid pulse width corresponding to the current profile before change and the invalid pulse width corresponding to the current profile after the change, as the minimum calculation.

Thus, since the drive current switch performing means 102 can select the invalid pulse width that matches the changed current profile according to the timing to change the actual current profile of the injector, it can accurately perform control of the fuel injection quantity and control the fluctuation of air fuel ratio of the internal combustion engine even when the current profile is changed.

Figure 11:
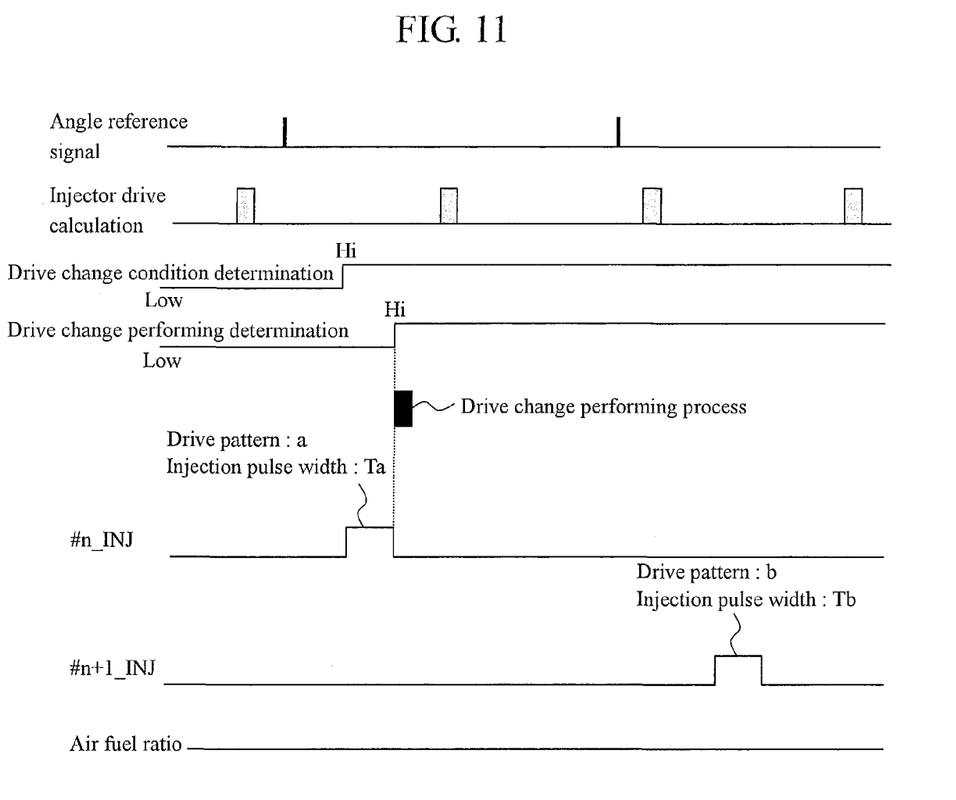
FIG. 11 is a view showing one example of a control time chart of the injector according to the embodiment.

FIG. 11 shows one example of a control timing chart of the injector according to the present embodiment. The angle reference signal and drive calculation of the injector in the diagram in the upper part of FIG. 11 are as already been described in FIG. 9, and a description is omitted here.

The determination on drive current change condition in the figure shows result of the determination on if the condition of whether or not the drive current switch determining means 101 as shown in FIG. 10 changes the current profile is satisfied, and the drive change performing determination shows result of the determination on the timing to perform the drive change, that is, whether it is timing when the drive current switch performing means 102 as shown in FIG. 10 may change the current profile.

First, the drive current switch determining means 101 allows the drive change when the drive change condition changes from Lo→Hi depending on the operation state of the internal combustion engine. Then, if the fuel injector is driven, and if it is before the injector is driven, the current profile of the drive current of the injector will be changed, and the drive current profile and the fuel injection pulse width cannot be matched. Therefore, even if the drive condition determination is satisfied, the drive current profile of the injector is not changed immediately, and a determination on the timing to perform the change is made by the drive current switch performing means 102.

As shown in the figure, in the injector of #n_INJ of the cylinder of #n, the drive condition determination is satisfied, the drive pattern (current profile): a, and fuel injection pulse width: Ta. Here, even if the drive current switch determining means 101 determines that the drive change condition is satisfied (becomes Hi), it maintains control of fuel injection with the drive pattern before change: a and the fuel injection pulse width: tb, instead of the drive pattern (current profile): b and the fuel injection pulse width: Tb.

Next, the drive current switch determining means 101 determines after the current profile and the fuel injection pulse width of the fuel injection drive of the #n_INJ perform the drive pattern: a and the fuel pulse width: Ta, for example, when #n_INJ fuel injection ends (synchronous with the end of the injection of the injector, if it is shown in the figure), and performs the drive change performing determination that performs the change of the current profile of the drive current of the actual injector (Lo→Hi in the figure).

Based on the result of the drive change performing determination (Lo→Hi), not only the current profile of the injector is actually changed, but also the invalid pulse width corresponding to the changed current profile is selected from the multiple invalid pulse widths of the fuel injection pulse width of the injector which has been calculated in advance. With this, fuel injection of #n_INJ ends, and in the injector of #n+1_INJ of the cylinder of #n+1 of the next cylinder, control of the injector is performed as the drive pattern: b and the fuel injection pulse width: Tb.

Thus, when the current profile of the injector is switched, appropriate control of the fuel injection quantity can be implemented by matching the drive current profile of the injector and the fuel injection pulse width (drive pulse width). Consequently, as shown in the figure, stable exhaust emission and operability of the internal combustion engine can be provided without changing the air fuel ratio of the internal combustion engine.

Figure 12:
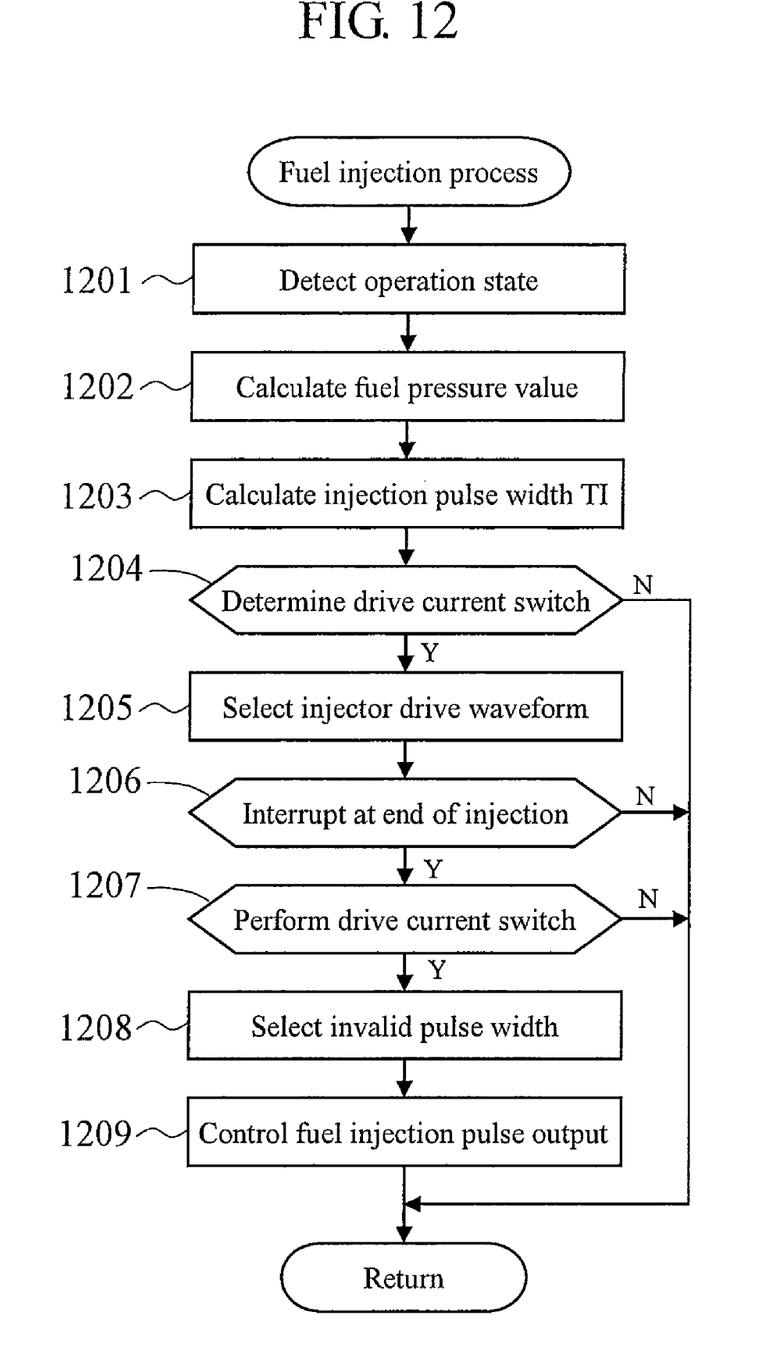
FIG. 12 is a view showing one example of a flow chart of control of the injector according to the embodiment.

FIG. 12 shows one example of a flow chart of control of the injector according to the present embodiment.

First, in step 1201, the operation state of the internal combustion engine is detected. Next, in step 1202, a value of fuel pressure to be supplied to the injector of the internal combustion engine is calculated. In step 1203, a fuel injection pulse width is calculated based on the operation state of the internal combustion engine and the fuel pressure of the internal combustion engine. To be specific, in step 1203, as shown in FIG. 10, a valid pulse width of the injector and the invalid pulse width of the injector corresponding to all patterns of the current profile of drive current of the injector are calculated.

In step 1204, drive current switching determination of the injector is made according to at least any one or more conditions of the operation state of the internal combustion engine or the fuel pressure of the internal combustion engine. When with this the switch is Yes (Y), in step 1205, selection is made from the current profiles of the drive currents of multiple injectors. In step 1206, it is determined whether or not an interrupt at the end of injection of the injector has actually occurred. If the interrupt at the end of fuel injection occurs, the process proceeds to step 1207, the change is performed so that the drive current of the injector will be actually injector drive current profile selected in step 1205. Here, although as the timing to perform the switch (change) of the current profile of the drive current of the injector, the interrupt at the end of the injection of the injector was actually cited as an example, the determination may be made based on information of a crank angle of the internal combustion engine which is not performing fuel injection or the time course from the fuel injection because the switch may be performed between the fuel injections (during which fuel injection is not performed), and a determination may be made by directly detecting whether or not the fuel injection is performed.

In step 1208, from invalid pulse width calculated values of the multiple injectors which were calculated in step 1203, the invalid pulse width which matches the current profile of the drive current of the injector selected in the step 1205 is selected. In step 1209, according to the timing to perform injection of the injector, the injector is controlled by outputting fuel injection pulse width to which the valid pulse width of the injector calculated in the step 1203 and the invalid pulse switch calculated in the step 1208 are added.

Figure 13:
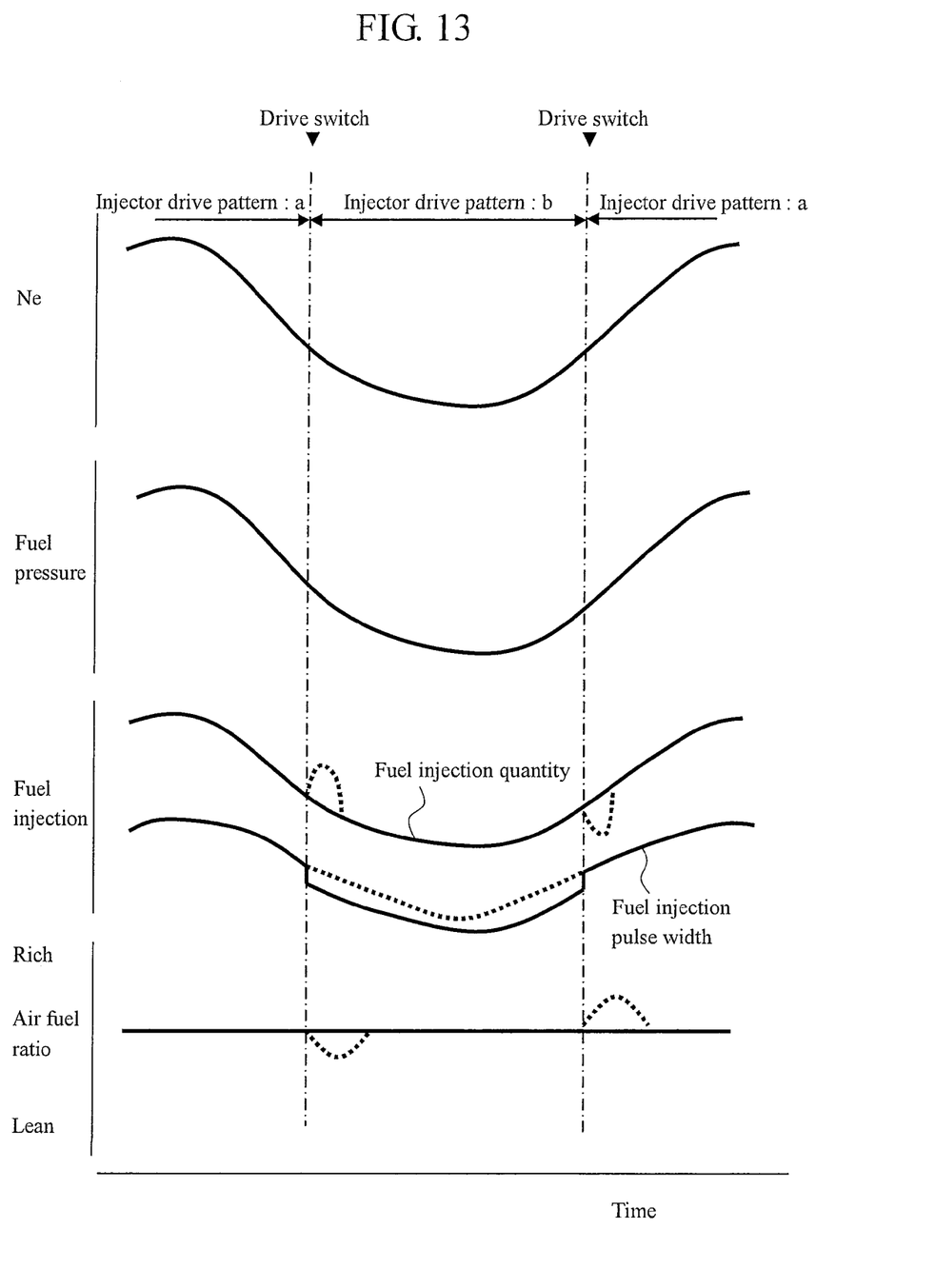
FIG. 13 is a view showing one example of a time chart when fuel is injected by the fuel injection control apparatus according to the embodiment.

FIG. 13 shows one example of the time chart during fuel injection by the fuel injection control apparatus according to the present embodiment. The diagram in the upper part of the figure shows the engine speed Ne and the fuel pressure of the internal combustion engine. The positions represented in the figure by the two positions on the vertical dotted line are indicated as the positions where the current profile of the drive current of the injector has been changed.

In addition, the diagram in the middle part in the figure shows the fuel injection quantity from the injector and the fuel injection pulse width. The operation shown by the solid line is the operation by the fuel injection control apparatus according to the present embodiment, and that shown by the dotted line is a case in which the fuel injection control apparatus of the present embodiment is not applied. The diagram in the lower part of the figure shows the behavior of the air fuel ratio of the internal combustion engine by the fuel injection quantity from the injector. Similarly, the operation shown by the solid line is the operation of the present invention and that shown by the dotted line is the case in which the present invention is not applied.

First, in the injector drive current switch (when the current profile is changed) in the left side of the figure, the current profile (injector drive pattern) of the drive current of the injector is switched from a→b. As a result of this, at the current profile switching, the fuel injection pulse width changes to the invalid pulse width of the fuel injection pulse width which has been calculated according to the changed current profile, as represented as a step in the figure.

Consequently, when the current profile of the drive current of the injector is switched and even after it is switched, the fuel injection quantity will smoothly change in accordance with the operation state and a change in the fuel pressure of the internal combustion engine. As a result, the air fuel ratio can also be stably controlled.

Next, in the injector drive current switch (when the current profile is changed) in the left side of the figure, the injector drive current profile (injector drive pattern) is switched from b→a. Also here, similar to the above description, it becomes possible to stably control the air fuel ratio by changing the injector drive pulse width.

On the one hand, when the current profile of the drive current of the injector is switched (changed) to any of a→b or b→a if the fuel injection control according to the present embodiment is not applied, fluctuation of the air fuel ratio, as shown by the dotted line in the figure, will occur although the current profiles are smoothly outputted in the fuel injection pulse width, because the current profile of the drive current of the injector and the invalid pulse width do not match. This is just as described with use of FIG. 9 and FIG. 11.

The embodiment of the present invention is described in detail above. According to the present embodiment, even when the fuel injection quantity is reduced than before, such as split injection, it becomes possible to control the fuel injection quantity with accuracy when the current profile of the drive current of the injector is changed and even after it is changed in accordance with the operation state of the internal combustion engine. Consequently, the stable air fuel ratio control of the internal combustion engine can be provided, and thereby exhaust emission and deterioration in operation performance of the internal combustion engine can be avoided.

What is claimed is:

1. A fuel injection control apparatus for injecting fuel directly into a combustion chamber of an internal combustion engine, comprising a fuel injector which performs fuel injection by supplying a drive current to a solenoid, a fuel pressure sensor which detects fuel pressure supplied to the fuel injector, and operation state detecting means which detects an operation state of the internal combustion engine, the fuel injection control apparatus for the internal combustion engine, comprising:

current profile changing means which has multiple current profiles of the drive current and changes the current profiles based on the operation state and the fuel pressure;

valid pulse width calculating means which calculates a valid pulse width corresponding to a fuel injection quantity for opening and driving the fuel injector, based on the operation state and the fuel pressure;

invalid pulse width calculating means which calculates an invalid pulse width corresponding to valve opening delay and valve closing delay of the fuel injector, based on the fuel pressure; and fuel injector control means which calculates a fuel injection pulse width based on the valid pulse width and the invalid pulse width, and controls the fuel injector based on the fuel injection pulse width, wherein the invalid pulse width calculating means calculates an invalid pulse width corresponding to the current profiles to be changed before the current profiles are changed.

2. The fuel injection control apparatus for an internal combustion engine according to claim 1, wherein the invalid pulse width calculating means calculates an invalid pulse width corresponding to the multiple current profiles, and the fuel injector control means selects an invalid pulse width corresponding to changed current profiles in accordance with the change in the current profiles, and performs control of the fuel injector based on the selected invalid pulse width.

3. The fuel injection control apparatus for an internal combustion engine according to claim 1, wherein the invalid pulse width calculating means calculates an invalid pulse width corresponding to the current profiles before being changed, and an invalid pulse width corresponding to the current profiles after being changed, and the fuel injector control means performs control of the fuel injector in accordance with the change of the current profiles and based on the invalid pulse width corresponding to the current profiles after being changed.

4. The fuel injection control apparatus for an internal combustion engine according to claim 1, wherein the current profile changing means performs changing of the current profiles, synchronous with end of fuel injection of the fuel injector.

5. The fuel injection control apparatus for an internal combustion engine according to claim 1, wherein the current profile changing means performs changing of the current profiles in a period after the fuel injector ends fuel injection till it starts next fuel injection.

6. The fuel injection control apparatus for an internal combustion engine according to claim 5, wherein the current profile changing means performs the changing of the current profiles in a period after the fuel injector ends fuel injection till it starts next fuel injection, at timing when a predetermined period of time elapses after the end of the fuel injection.

7. The fuel injection control apparatus for an internal combustion engine according to claim 5, wherein the current profile changing means performs the changing of the current profiles in a period after the fuel injector ends fuel injection till it starts next fuel injection, at a crank angle at which the fuel injection is not performed.

8. The fuel injection control apparatus for an internal combustion engine according to claim 2, wherein the invalid pulse width is selected after the current profiles are changed and after the fuel injection ends.

* * * * *